No. 661,769. Patented Nov. 13, 1900.
J. A. PERKINS.
SHEET METAL CAGE FOR ROLLER BEARINGS.
(Application filed Apr. 10, 1900.)
(No Model.)
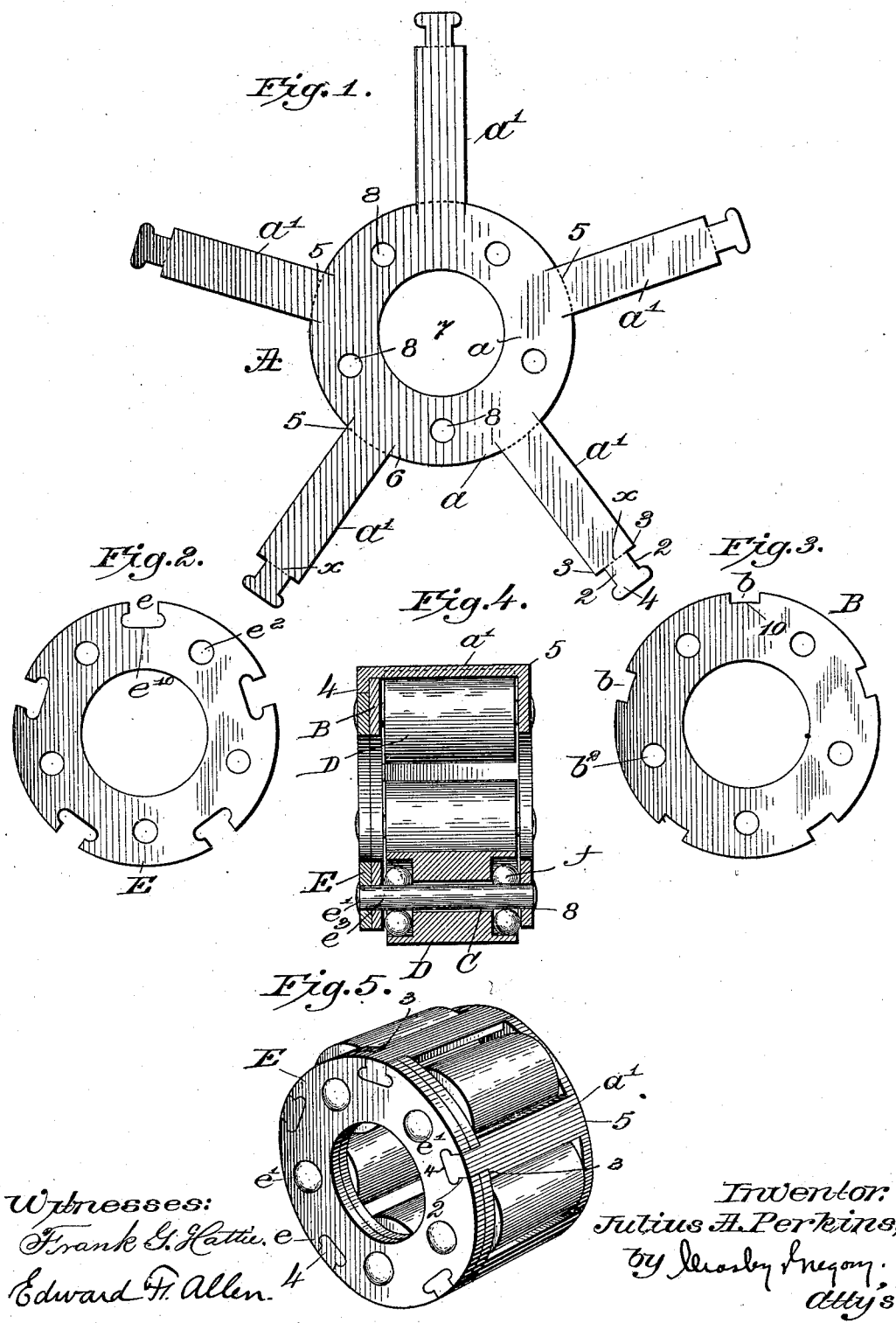
Witnesses:
Frank G. Hattie.
Edward F. Allen.
Inventor:
Julius A. Perkins,
by Crosby & Gregory
attys.

UNITED STATES PATENT OFFICE.

JULIUS A. PERKINS, OF OMAHA, NEBRASKA, ASSIGNOR TO THE MOFFETT BEARING COMPANY, OF COUNCIL BLUFFS, IOWA.

SHEET-METAL CAGE FOR ROLLER-BEARINGS.

SPECIFICATION forming part of Letters Patent No. 661,769, dated November 13, 1900.

Application filed April 10, 1900. Serial No. 12,282. (No model.)

*To all whom it may concern:*

Be it known that I, JULIUS A. PERKINS, a citizen of the United States, and a resident of Omaha, county of Douglas, State of Nebraska, have invented an Improvement in Sheet-Metal Cages for Roller-Bearings, of which the following description, in connection with the accompanying drawings, is a specification, like characters on the drawings representing like parts.

This invention relates to a novel sheet-metal cage for holding roller-bearings, said cage being an improvement on United States Patent No. 627,137 granted to me and dated June 20, 1899. Herein one end of the cage and the bars connecting it with the opposite end of the cage are integral, the ends of the bars being cut and shaped to present engaging devices inturned or radiating toward the center of the cage. The inturned ends of the arms enter notches cut into the periphery of a ring-shaped cage end, the said cage end being backed up by a backing-ring. Suitable antifriction means are interposed between the ends of the usual bearing-rollers and the inner side of the main end wall of the cage and the backing-ring.

Figure 1 shows a blank from which is formed one end and the bars of the cage. Fig. 2 shows the ring-shaped cage end detached. Fig. 3 shows the backing-ring. Fig. 4 is a section of the blank bent into its operative shape and assembled with the cage end and backing-ring, said figure showing bearing-rollers therein containing one form of antifriction means; and Fig. 5 shows the roller-cage and bearing-rollers in perspective.

To produce my improved cage, I cut from sheet metal a spider-like blank A, it presenting a circular portion $a$, having, as herein represented, a series of five arms $a'$, the extremities of which are notched at their sides, as at 2, to leave shoulders 3 and enlargements 4. The blank is bent in the dotted lines 5 coincident with the circle 6 of the blank, and the arms are bent again in the dotted lines $x$, the projecting ends 4 being turned toward the center opening 7 of the blank, and the blank is provided with a series of spindle-holes 8. To further complete the cage, I form from sheet metal an outer end ring E for the cage end, it having cut into it from its periphery a series of spaces $e$, shaped to receive a part of the neck of the bars between the notches 2 2, the ends 4 of the bars entering the spaces $e$, said end having also a series of holes $e^2$, in which enter one end of each of the series of spindles C.

The cage contains a backing-plate B, Fig. 3, provided with notches $b$, which may be entered by the narrower parts of the bars between the notches 2 2, the shoulders 3 3 meeting the portions of the periphery of the plate E extended beyond the bottoms 10 of the notches $b$, the edges of the enlargements 4 being slightly brazed where they come in contact with the plate E. The plate B has also holes $b^2$, corresponding in number with the holes 8, said holes receiving and sustaining fixedly the ends of spindles C, entering the bearing-rollers D.

Fig. 5 shows the cage and roller-bearings assembled for use.

The ends of the bearing-rollers (see Fig. 4) are chambered, and in said chambers I have placed antifriction means, shown as a series of balls $f$, sustaining the flanges of the rollers and contacting with the inner side of the main end wall of the cage and with the inner side of the backing-plate, thus preventing the contact of the ends of the rollers with the said cage and plate, and they also prevent contact of the rollers with the spindles.

Instead of balls I may use any other equivalent antifriction means.

Having described my invention, what I claim as new, and desire to secure by Letters Patent, is—

A sheet-metal roller-cage composed of an end plate having integral bars occupying a position parallel with the longitudinal center of the cage, said bars having inturned ends notched and provided with enlargements, a backing-plate notched at its periphery, and a notched cage end, the inner ends of the notches of the cage end being enlarged to receive the enlargements at the ends of the arms.

In testimony whereof I have signed my name to this specification in the presence of two subscribing witnesses.

JULIUS A. PERKINS.

Witnesses:
ELLERY H. WESTERFIELD,
MARY H. McCULLOCH.